(12) United States Patent
Hunt et al.

(10) Patent No.: US 8,964,168 B1
(45) Date of Patent: Feb. 24, 2015

(54) METHODS AND SYSTEMS FOR DETECTING AN OBJECT

(75) Inventors: Jeffrey H. Hunt, Thousand Oaks, CA (US); Nicholas Koumvakalis, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 200 days.

(21) Appl. No.: 13/477,546

(22) Filed: May 22, 2012

(51) Int. Cl.
*G01C 3/08* (2006.01)

(52) U.S. Cl.
USPC ........... 356/5.09; 356/3.01; 356/3.1; 356/4.1; 356/5.01

(58) Field of Classification Search
USPC ............. 356/3.01–3.15, 4.01–4.1, 5.01–5.15, 356/6–22, 28, 28.5
See application file for complete search history.

(56) References Cited

U.S. PATENT DOCUMENTS

| | | | |
|---|---|---|---|
| 4,053,891 A | 10/1977 | Opitz | |
| 4,289,397 A | 9/1981 | Itzkan et al. | |
| 4,932,775 A * | 6/1990 | Wissman et al. | 356/5.09 |
| 5,191,343 A | 3/1993 | Danzer et al. | |
| 5,864,391 A * | 1/1999 | Hosokawa et al. | 356/4.01 |
| 6,594,000 B2 | 7/2003 | Green et al. | |
| 7,848,010 B2 | 12/2010 | Furuya et al. | |
| 7,957,648 B2 | 6/2011 | Hillis et al. | |
| 8,035,550 B2 | 10/2011 | Holly et al. | |
| 8,125,620 B2 | 2/2012 | Lewis | |
| 2004/0135992 A1* | 7/2004 | Munro | 356/4.01 |

* cited by examiner

*Primary Examiner* — Luke Ratcliffe
(74) *Attorney, Agent, or Firm* — Armstrong Teasdale LLP (57) ABSTRACT

A detection system for detecting an object includes a transmitter including a light source configured to emit a first light beam having a first frequency towards the object. The detection system also includes a receiver configured to receive a second light beam reflected from the object, and a detector positioned within the receiver. The second light beam has a second frequency as a result of a non-linear optical response of a surface of the object to the first light beam. The detector is configured to detect the object based on the second frequency of the second light beam.

22 Claims, 5 Drawing Sheets

METHODS AND SYSTEMS FOR DETECTING AN OBJECT

BACKGROUND

The field of the disclosure relates generally to light-based detection systems, and more specifically, to methods and systems for detecting an object.

At least some known detection systems use light beams to detect an object and/or to determine a distance to the object. For example, known light detection and ranging (LIDAR) systems transmit a light beam towards an object and detect a light beam reflected from the object. The transmit time of the light beam (i.e., the difference between the time at which the light beam is transmitted to the object and the time at which the reflected light beam is received from the object) is used to determine the distance to the object.

However, at least some known LIDAR systems use lasers that may be subject to significant atmospheric scattering and/or absorption, thus reducing the effectiveness of the such systems in certain environments. Moreover, such LIDAR systems typically transmit and receive the light beams along the same path. Accordingly, an object targeted by the LIDAR system may be able to undesirably detect the location of the LIDAR system.

BRIEF DESCRIPTION

In one aspect, a detection system for detecting an object is provided that includes a transmitter including a light source configured to emit a first light beam having a first frequency towards the object. The detection system also includes a receiver configured to receive a second light beam reflected from the object, and a detector positioned within the receiver. The second light beam has a second frequency as a result of a non-linear response of a surface of the object to the first light beam. The detector is configured to detect the object based on the second frequency of the second light beam.

In another aspect, a method of detecting an object is provided that includes emitting a first light beam having a first frequency towards the object, and receiving a second light beam reflected from the object. The second light beam has a second frequency as a result of a non-linear response of a surface of the object to the first light beam. The method also includes detecting the object based on the second frequency of the second light beam.

The features, functions, and advantages that have been discussed can be achieved independently in various embodiments or may be combined in yet other embodiments further details of which can be seen with reference to the following description and drawings.

DETAILED DESCRIPTION

Figure 1:
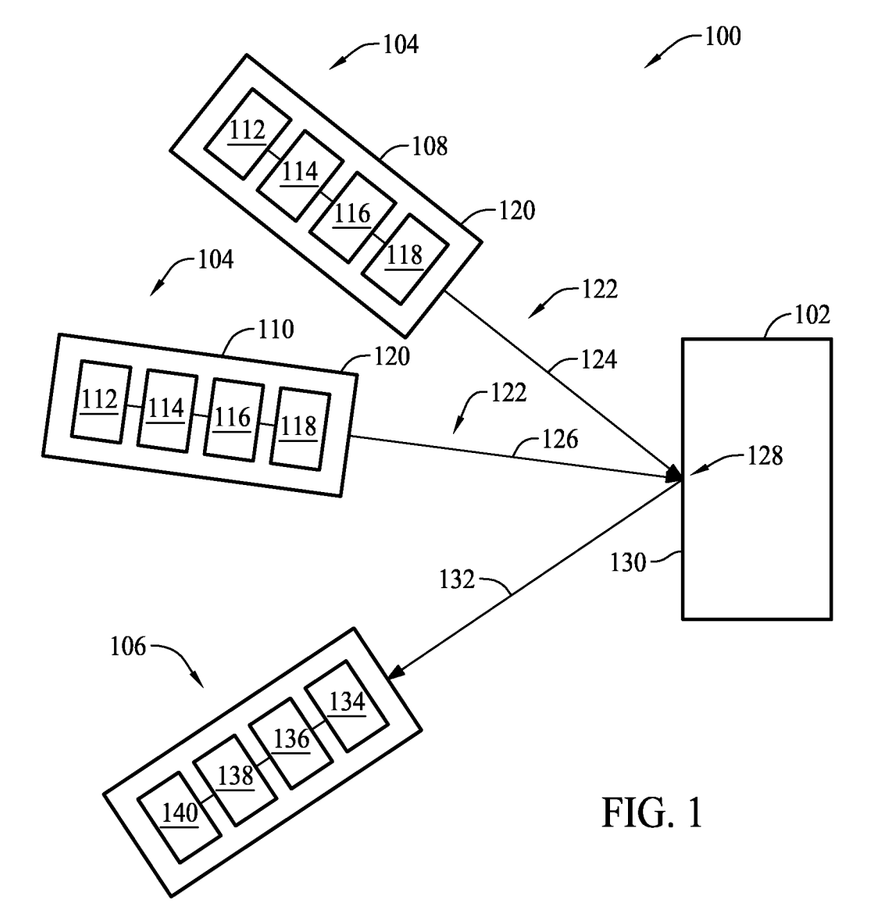
FIG. 1 illustrates an exemplary detection system that may be used to detect an object and/or that may be used to determine a distance to the object.

FIG. 1 illustrates an exemplary detection system 100 that may be used to detect an object 102, and/or that may be used to determine a distance to object 102. Detection system 100 includes at least one transmitter 104 and at least one receiver 106. In the exemplary embodiment, detection system 100 includes a first transmitter 108, a second transmitter 110, and receiver 106. Alternatively, detection system 100 may include any number of transmitters 104 and/or receivers 106 that enables detection system 100 to function as described herein. Object 102 may include a vehicle, a building, a person, or any other object that at least partially reflects light. As used herein, the terms "reflect" and "reflected light" refer to any light which interacts with an object having optical characteristics which allow for an electromagnetic interaction and re-radiation of the incoming light.

Unless otherwise specified, each transmitter 104 is substantially similar, and includes a light source 112, an output intensity control module 114, an output frequency control module 116, and an output polarization control module 118 that are positioned within a housing 120. Light source 112 generates a light beam 122 that is emitted from transmitter 104. In the exemplary embodiment, light source 112 is a laser. Alternatively, light source 112 is any other source that enables transmitter 104 to generate light beam 122 as described herein.

Output intensity control module 114 is coupled to light source 112. Output intensity control module 114 receives light beam 122 from light source 112 and controls and/or adjusts an intensity of beam 122. In the exemplary embodiment, output intensity control module 114 includes a feedback system that controls and/or adjusts the intensity of light beam 122 and outputs light beam 122 at a predetermined intensity. Alternatively, output intensity control module 114 may include any other device that enables transmitter 104 to control the intensity of light beam 122 as described herein.

Output frequency control module 116 is coupled to output intensity control module 114. Output frequency control module 116 receives light beam 122 from output intensity control module 114 and controls and/or adjusts a frequency of beam 122. In the exemplary embodiment, output frequency control module 116 includes an etalon, a passive grating, and/or an optical filter. Alternatively, output frequency control module 116 may include any other device that enables transmitter 104 to control and/or adjust the frequency of light beam 122 as described herein.

Output polarization control module 118 is coupled to output frequency control module 116. Output polarization control module 118 receives light beam 122 from output frequency control module 116 and controls and/or adjusts a polarization of light beam 122. In the exemplary embodiment, output polarization control module 118 includes a polarizer and/or a wave plate. Alternatively, output polarization control module 118 may include any other device that enables transmitter 104 to control and/or adjust the polarization of light beam 122 as described herein.

In the exemplary embodiment, first transmitter 108 and second transmitter 110 emit light beams 122 at different frequencies from each other. More specifically, first transmitter 108 emits a first light beam 124 having a first frequency, and second transmitter 110 emits a second light beam 126 having a second frequency. Each light beam 122 is focused at a common location or point 128 (also referred to as a focal point 128) on a surface 130 of object 102 such that first light beam 124 and second light beam 126 at least partially overlap on surface 130.

First light beam 124 and/or second light beam 126 interact with each other and with surface 130 in a non-linear fashion such that a third light beam 132 (also referred to herein as a "reflected light beam 132") is reflected from surface 130. The non-linear interaction or response of surface 130 with respect to first light beam 124 and/or second light beam 126 causes the frequency of reflected light beam 132 to be a non-linear combination of the frequencies of first light beam 124 and/or second light beam 126.

As used herein, the term "non-linear" refers to an interaction between a light beam and a surface such that a light beam reflected from the surface has a frequency that is different from the frequency of the light beam received at the surface. In contrast, the term "linear" refers to an interaction between the light beam and the surface such that the light beam reflected from the surface has a frequency that is the same as the frequency of the light beam received at the surface.

In the exemplary embodiment, the non-linear response of surface 130 causes reflected light beam 132 to have a second harmonic frequency of first light beam 124 or of second light beam 126 (i.e., a frequency that is two times the frequency of first light beam 124 or two times the frequency of second light beam 126), or causes reflected light beam 132 to have a second order combination (i.e., a second order effect) of first light beam and second light beam 126. The second order effect may cause reflected light beam 132 to have a frequency that is equal to a sum of the frequencies of first light beam 124 and second light beam 126, or a frequency that is equal to a difference between the frequencies of first light beam 124 and second light beam 126. Alternatively or additionally, the frequency of reflected light beam 132 may include any other non-linear combination or response to first light beam 124 and/or second light beam 126. In an embodiment that includes only a first transmitter 108, the non-linear response of surface 130 to first light beam 124 causes reflected light beam 132 to be generated having a second harmonic frequency of first light beam 124.

In the exemplary embodiment, receiver 106 is positioned to receive reflected light beam 132. Receiver 106 includes an input polarization control module 134, an input frequency control module 136, an input intensity control module 138, and a detector 140. In the exemplary embodiment, unless otherwise specified, input polarization control module 134, input frequency control module 136, and input intensity control module 138 are substantially similar to, and/or include similar devices as, output polarization control module 118, output frequency control module 116, and output intensity control module 114, respectively.

Input polarization control module 134 receives reflected light beam 132 from object 102 and controls and/or adjusts a polarization of reflected light beam 132. In the exemplary embodiment, input polarization control module 134 is tuned or configured to substantially match output polarization control module 118 such that input polarization control module 134 "passes through" signals having the polarization of first light beam 124 and/or second light beam 126.

Input frequency control module 136 receives reflected light beam 132 from input polarization control module 134. Input frequency control module 136 is tuned to a desired, or predetermined, frequency or frequency range that includes the non-linear frequency response of surface 130 (hereinafter referred to as the "non-linear frequency"). More specifically, input frequency control module 136 filters out frequencies that are not equal to the non-linear frequency expected to be present within reflected light beam 132 such that only the non-linear component of beam 132 is passed through module 136. As described above, the expected non-linear frequency of reflected light beam 132 is a second harmonic frequency of first light beam 124 and/or of second light beam 126, and/or a second order effect or combination of first light beam 124 and second light beam 126 (e.g., a sum or a difference of the frequencies of first light beam 124 and second light beam 126).

Input intensity control module 138 receives reflected light beam 132 and adjusts the intensity of beam 132. More specifically, input intensity control module 138 adjusts the intensity of reflected light beam 132 such that the intensity is within an intensity range (e.g., within a linear response regime) of detector 140.

Detector 140 receives reflected light beam 132 from input intensity control module 138 and detects an intensity of beam 132. In the exemplary embodiment, if the intensity of reflected light beam 132 is equal to, or greater than, a predetermined threshold value, detector 140 outputs a signal indicating that object 102 was detected. A distance to object 102, such as a distance from object 102 to first transmitter 108, second transmitter 110, and/or receiver 106 may be determined, as is described more fully herein.

Figure 2:
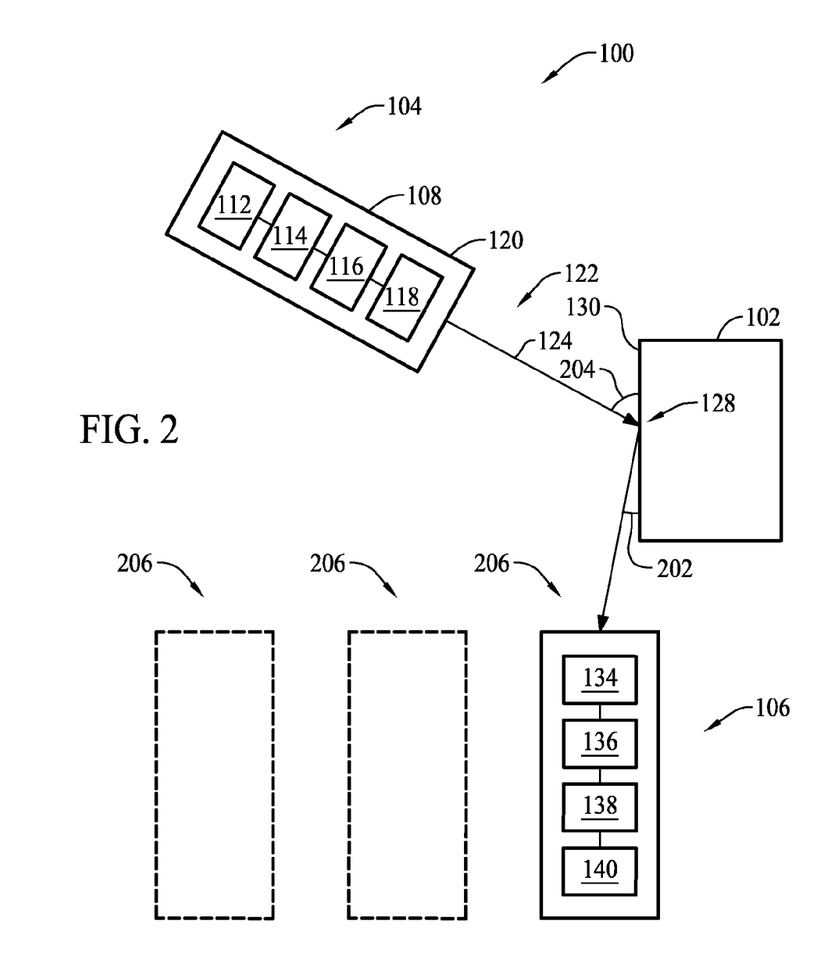
FIG. 2 illustrates an exemplary detection system in which a receiver is moved to align with a reflected light beam.
Figure 3:
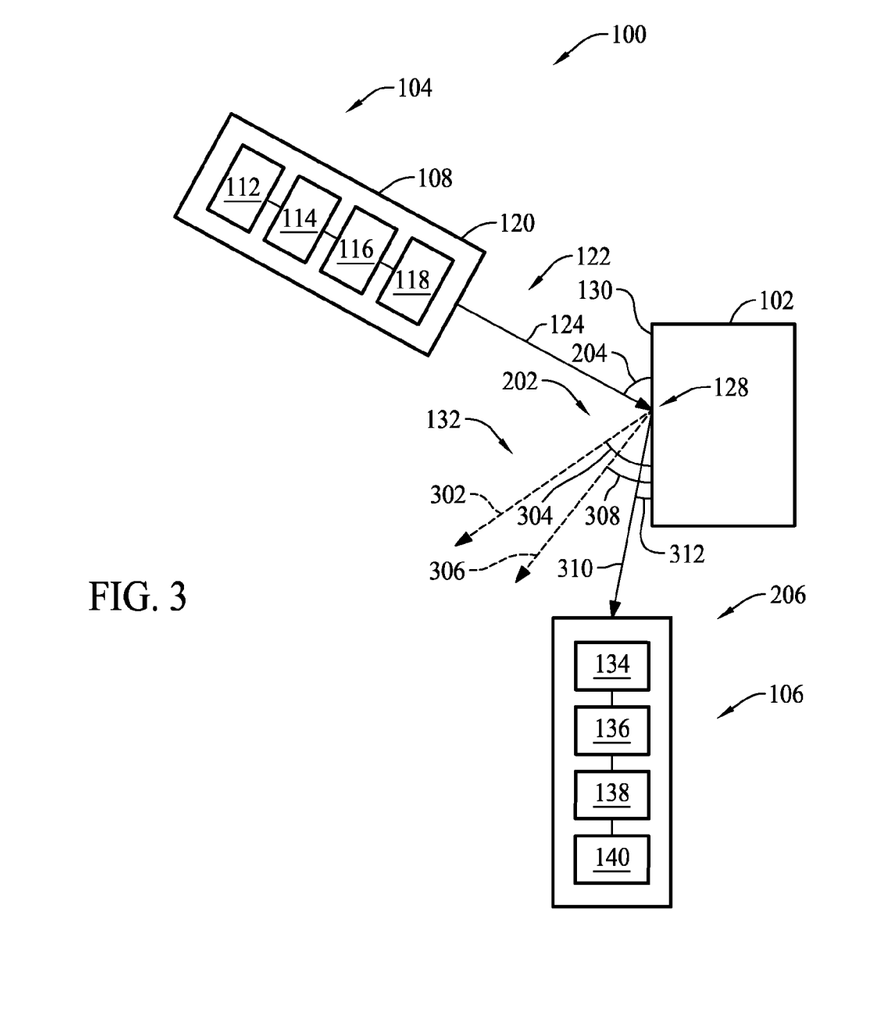
FIG. 3 illustrates an exemplary detection system in which a frequency of a first light beam is adjusted to align a reflected light beam with a receiver.

FIG. 2 illustrates a block diagram of an exemplary detection system 100 in which receiver 106 is moved to align with reflected light beam 132. FIG. 3 illustrates a block diagram of an exemplary detection system 100 in which a frequency of first light beam 124 is adjusted to align reflected light beam 132 with receiver 106.

It should be recognized that an angle 202 at which reflected light beam 132 is reflected from object surface 130 (hereinafter referred to as a "reflection angle 202") is dependent upon an angle 204 at which first light beam 124 is incident upon surface 130 (hereinafter referred to as an "incident angle 204") and upon the frequency of first light beam 124, due to the non-linear interaction of surface 130 and first light beam 124. In certain situations, reflection angle 202 may cause reflected light beam 132 to be directed away from receiver 106. Accordingly, in the embodiment shown in FIG. 2, incident angle 204 and the frequency of first light beam 124 are held substantially constant while receiver 106 is moved to align with reflected light beam 132. More specifically, receiver 106 is moved through (or "swept through") a plurality of locations 206 to align receiver 106 with reflected light beam 132. For example, receiver 106 is moved through locations 206 until detector 140 detects reflected light beam 132 as described above.

In the embodiment shown in FIG. 3, incident angle 204 and location 206 of receiver 106 are held substantially constant while the frequency of first light beam 124 is adjusted to align reflected light beam 132 with receiver 106. More specifically, the frequency of first light beam 124 is adjusted to, or "swept through," each of a plurality of frequencies to generate reflected light beams 132 at a plurality of reflection angles 202. For example, first light beam 124 is emitted from first transmitter 108 at a first frequency such that a first reflected light beam 302 is reflected from object surface 130 at a first reflection angle 304. Moreover, first light beam is emitted from first transmitter 108 at a second frequency such that a second reflected light beam 306 is reflected from object surface 130 at a second reflection angle 308, and first light beam 124 is emitted from first transmitter 108 at a third frequency such that a third reflected light beam 310 is reflected from object surface 130 at a third reflection angle 312.

In one example, receiver 106 detects third reflected light beam 310 at third reflection angle 312, and transmits a signal to first transmitter 108 indicating that third reflected light beam 310 was detected. In response to the signal received from receiver 106, first transmitter 108 stops adjusting the frequency of first light beam 124, and first light beam 124 is repeatedly reflected towards receiver 106 as third reflected light beam 310. The distance to object 102 may be determined as described above.

Accordingly, as described herein, detection system 100 facilitates determining a location 206 for receiver 106 to enable receiver 106 to detect object 102 and/or reflected light beam 132. More specifically, the detection of object 102 is accomplished by the detection of reflected light beam 132. Moreover, first transmitter 108 may emit first light beam 124 at a controllable or selectable frequency that reduces an interference with an ambient atmosphere or environment (not shown) while positioning receiver 106 in a location 206 that enables receiver 106 to detect reflected light beam 132. Accordingly, an efficiency of detection system 100 is facilitated to be increased as compared to at least some prior art systems.

Figure 4:
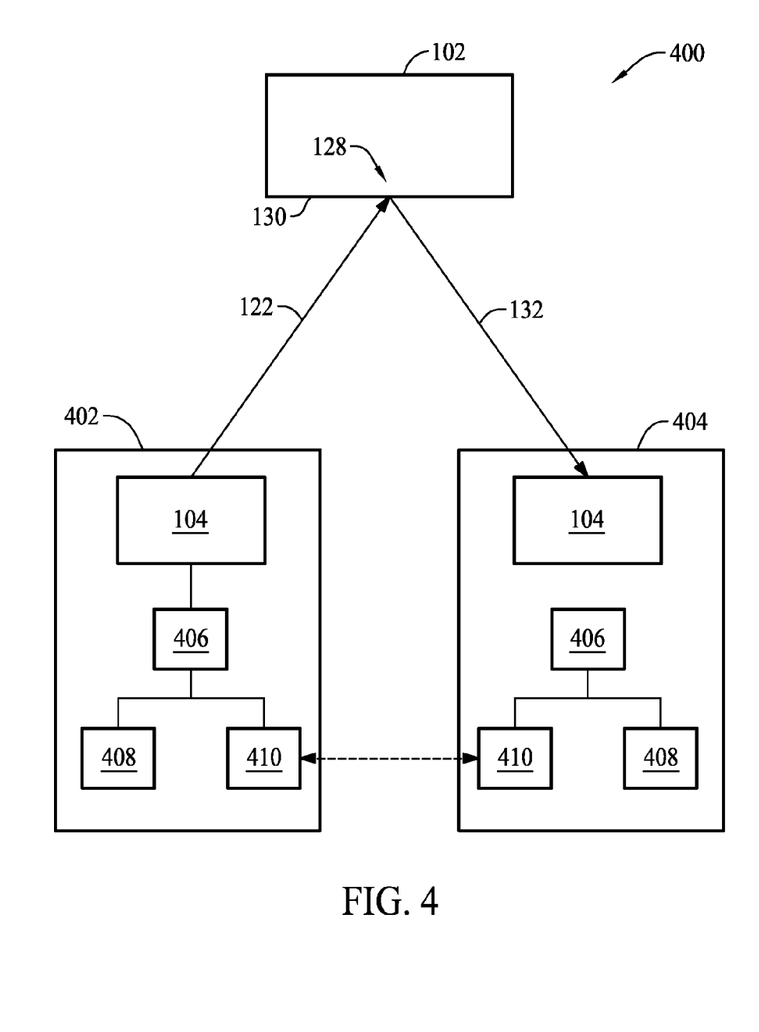
FIG. 4 illustrates another exemplary detection system that may be used to detect an object and/or that may be used to determine a distance to the object.

FIG. 4 is a block diagram of another exemplary detection system 400 that may be used to detect object 102, and/or that may be used to determine the distance to object 102. Unless otherwise specified, detection system 400 is similar to detection system 100 (shown in FIG. 1), and similar components are labeled in FIG. 4 with the same reference numerals used in FIG. 1.

In the exemplary embodiment, detection system 400 includes a transmitter system 402 and a receiver system 404. Transmitter system 402 includes transmitter 104, and receiver system 404 includes receiver 106. Moreover, transmitter system 402 and receiver system 404 each includes a processor 406, a memory 408, and a communication device 410 for use in communicating with each other.

Processor 406 includes any suitable programmable circuit including one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor."

Memory 408 includes a computer readable storage medium, such as, without limitation, random access memory (RAM), flash memory, a hard disk drive, a solid state drive, a diskette, a flash drive, a compact disc, a digital video disc, and/or any suitable memory. In the exemplary embodiment, memory 408 includes data and/or instructions that are executable by processor 406 to enable processor 406 to perform the functions described herein.

Communication device 410 may include, without limitation, a radio frequency (RF) transceiver, a network interface controller (NIC), a network adapter, and/or any other communication device that enables detection system 400 to operate as described herein. Communication devices 410 transmit data to, and receive from, with each other using any suitable communication protocol.

During operation, transmitter system 402 emits a light beam 122 towards object 102 via transmitter 104. Object surface 130 causes a non-linear interaction with light beam 122 such that reflected light beam 132 is generated having a frequency that is non-linear with respect to a frequency of light beam 122. Reflected light beam 132 is received and detected by receiver system 404 via receiver 106.

In the exemplary embodiment, data is transmitted between transmitter system 402 and receiver system 404 to facilitate determining the distance to object 102. For example, transmitter system 402 may transmit, to detection system 400, a time that light beam 122 is emitted from transmission system 402. Additionally or alternatively, detection system 400 may transmit, to transmitter system 402, a time that reflected light beam 132 is received at detection system 400. Processor 406 of transmitter system 402 and/or of receiver system 404 may calculate the distance to object 102 based on a difference between the time that light beam 122 is emitted and the time that reflected light beam 132 is received.

In one embodiment, a frequency of light beam 122 is controlled or selected by processor 406 of transmitter system 402 to reduce an interference with ambient air or an ambient environment, as described above. Moreover, processor 406 may select or control the frequency of light beam 122 to control a reflection angle of reflected light beam 132 such that reflected light beam 132 is aligned with receiver 106 and/or receiver system 404.

In another embodiment, processor 406 of receiver system 404 may transmit data representative of a location of receiver system 404 to transmitter system 402, via communication devices 410, to facilitate aligning reflected light beam 132 with receiver 106. Additionally or alternatively, any other data may be transmitted between transmitter system 402 and receiver system 404.

Figure 5:
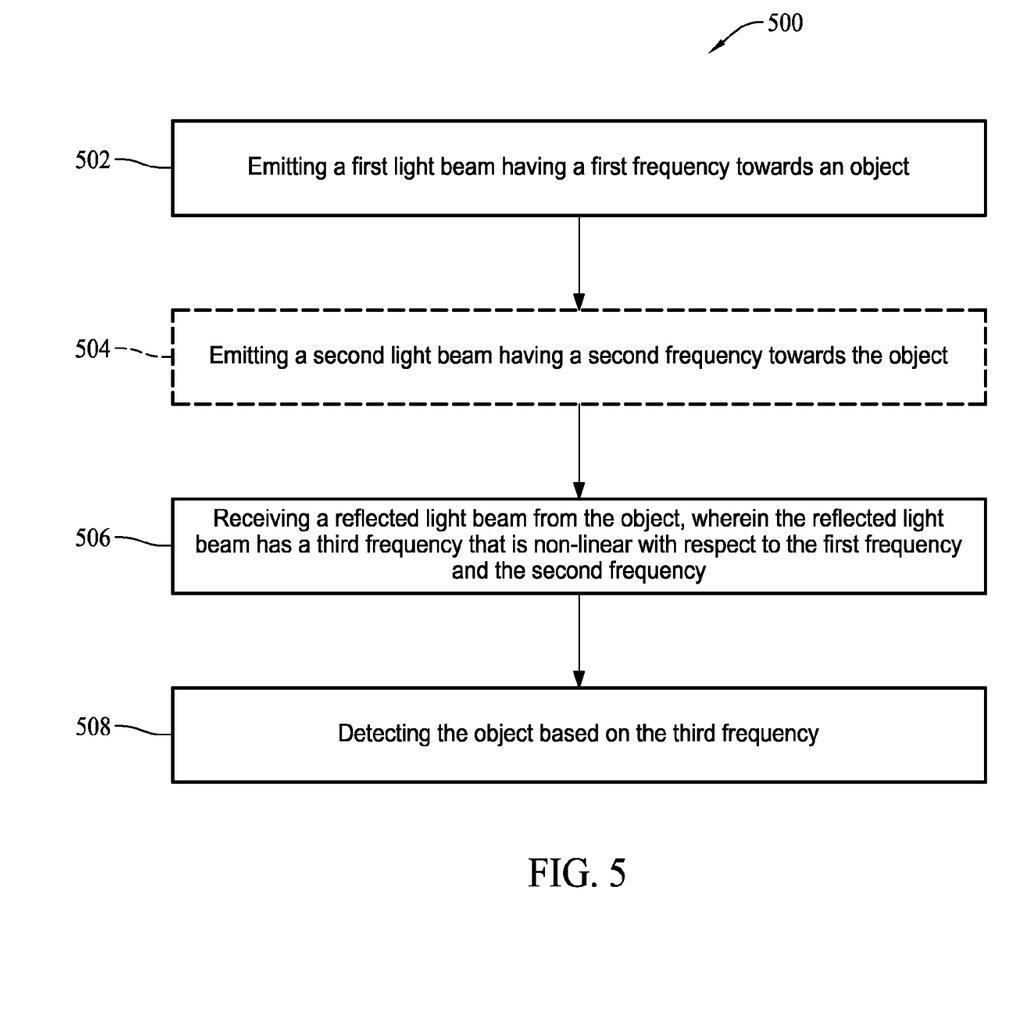
FIG. 5 is a flow diagram of an exemplary method that may be executed by the detection system of FIG. 1 and/or the detection system of FIG. 4 to detect an object.

FIG. 5 is a flow diagram of an exemplary method 500 of detecting an object that may be used with detection system 100 (shown in FIG. 1) and/or with detection system 400 (shown in FIG. 4). In the exemplary embodiment, method 500 is at least partially executed by processor 406 of transmitter system 402 and/or of receiver system 404 (shown in FIG. 4).

Method 500 includes, in the exemplary embodiment, emitting 502 a first light beam having a first frequency towards the object. In one embodiment, a second light beam having a second frequency is emitted 504 towards the object. In such an embodiment, the first light beam and the second light beam interact non-linearly with the surface of the object such that a reflected light beam is generated having a frequency that is non-linear with respect to the frequency of the first light beam and/or the second light beam.

The reflected light beam is received 506 from the object. The reflected light beam has a third frequency that is non-linear with respect to the first frequency and/or the second frequency. It should be recognized that in an embodiment that does not include emitting 504 the second light beam, the reflected light beam has a frequency that is non-linear with respect to the first frequency.

The detector is selectably tuned to the expected frequency of the reflected light beam. Accordingly, the receiver detects 508 the object based on the third frequency (i.e., the frequency of the reflected light beam).

In one embodiment, the first light beam is focused on a location on the surface of the object and the second light beam is also focused on the location. Focusing the first light beam and the second light beam on the surface location causes the first light beam and the second light beam to interact with each other and with the surface non-linearly to generate the reflected light beam having a frequency that is a non-linear combination of the first frequency and/or the second frequency. The non-linear combination of the first frequency and/or the second frequency may include a second order combination of the first frequency and the second frequency, such as a sum of the first frequency and the second frequency or a difference between the first frequency and the second frequency.

In another embodiment, the first light beam is transmitted towards the object at a plurality of frequencies to reflect the light beam at a plurality of angles until the reflected light beam is directed towards a receiver configured to detect the reflected light beam. In yet another embodiment, the first light beam is reflected from the object at a first angle, and the receiver is moved through a plurality of locations until the reflected light beam is aligned with the receiver.

The detection system described herein facilitates detecting an object and/or determining a distance to the object in a robust and efficient manner. The detection system emits a first light beam and a second light beam towards an object, and the light beams interact non-linearly with a surface of the object. The non-linear interaction of the surface and the light beams causes a reflected light beam to be generated that has a frequency that is non-linear with respect to the frequency of the first light beam and the frequency of the second light beam. The non-linear interaction causes the reflected light beam to be generated at an angle that is different than an incident angle of the first and second light beams. Accordingly, the location of the transmitter and/or the receiver may be more difficult to determine as compared to at least some prior art systems. In addition, the frequencies of the first and second light beams may be selected to reduce environmental scattering and/or absorption, in conjunction with the non-linear response of the surface to the light beams. As such, an efficiency of the detection system may be increased as compared to at least some prior art systems.

Exemplary embodiments of detection systems and methods for detecting an object are described above in detail. The detection systems and the methods are not limited to the specific embodiments described herein but, rather, components of the systems and/or steps of the methods may be utilized independently and separately from other components and/or steps described herein. Further, the described operations and/or components may also be defined in, or used in combination with, other systems, methods, and/or devices, and are not limited to practice with only the detection system as described herein.

Although the present embodiments are described in connection with detecting a distance to an object, the embodiments are operational to detect or determine other aspects or characteristics of objects. The detection systems described herein are not intended to suggest any limitation as to the scope of use or functionality of any aspect of the disclosure. In addition, the detection systems described herein should not be interpreted as having any dependency or requirement relating to any one or combination of components illustrated in the exemplary operating environment.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A detection system for detecting an object, said detection system comprising:
   a transmitter at a first location comprising a light source configured to emit a first light beam having a first frequency towards the object at an incident angle, such that a second light beam is reflected from the object at a reflection angle, wherein the reflection angle is dependent upon the first frequency;
   a receiver at a second location configured to receive the second light beam, wherein the second light beam has a second frequency as a result of a non-linear response of a surface of the object to the first light beam; and
   a detector positioned within said receiver, said detector configured to detect the object based on the second frequency of the second light beam.

2. A detection system in accordance with claim 1, wherein said transmitter is a first transmitter, said detection system comprising a second transmitter configured to emit a third light beam having a third frequency towards the object.

3. A detection system in accordance with claim 2, wherein said first transmitter focuses the first light beam on a location on the surface of the object and said second transmitter focuses the third light beam on the location.

4. A detection system in accordance with claim 2, wherein the first light beam and the third light beam interact with each other and with the surface non-linearly to generate the second light beam having the second frequency that is a non-linear combination of the first frequency and the third frequency.

5. A detection system in accordance with claim 4, wherein said detector is configured to detect the non-linear combination of the first frequency and the third frequency.

6. A detection system in accordance with claim 4, wherein the non-linear combination of the first frequency and the third frequency is a second order combination of the first frequency and the third frequency.

7. A detection system in accordance with claim 6, wherein the second order combination of the first frequency and the third frequency is a sum of the first frequency and the third frequency.

8. A detection system in accordance with claim 6, wherein the second order combination of the first frequency and the third frequency is a difference between the first frequency and the third frequency.

9. A detection system in accordance with claim 1, wherein at least one of said second location relative to said first location and the first frequency is adjustable to align said receiver and the second light beam.

10. A detection system in accordance with claim 9, wherein the incident angle and said second location are substantially constant, said transmitter is configured to sweep through a plurality of first frequencies such that the second light beam is reflected at a plurality of reflection angles until the second light beam is directed towards said second location.

11. A detection system in accordance with claim 9, wherein the first frequency and the incident angle are substantially constant, said receiver is configured to sweep through a plurality of second locations until the second light beam is aligned with said receiver.

12. A method of detecting an object, said method comprising:
   emitting a first light beam having a first frequency from a first location towards the object at an incident angle, such that a second light beam is reflected from the object at a reflection angle, wherein the reflection angle is dependent upon the first frequency;
   receiving the second light beam by a receiver at a second location, wherein the second light beam has a second frequency as a result of a non-linear response of a surface of the object to the first light beam; and
   detecting the object based on the second frequency of the second light beam.

13. A method in accordance with claim 12, further comprising emitting a third light beam having a third frequency towards the object.

14. A method in accordance with claim 13, further comprising focusing the first light beam on a location on the surface of the object and focusing the third light beam on the location.

15. A method in accordance with claim 13, further comprising:
   causing the first light beam and the third light beam to interact with each other and with the surface non-linearly to generate the second light beam having the second frequency that is a non-linear combination of the first frequency and the third frequency.

16. A method in accordance with claim 15, further comprising detecting the non-linear combination of the first frequency and the third frequency.

17. A method in accordance with claim 13, further comprising causing the first light beam and the third light beam to interact with each other and with the surface non-linearly to generate the second light beam having the second frequency that is a second order combination of the first frequency and the third frequency.

18. A method in accordance with claim 17, wherein generating the second light beam having the second frequency comprises generating the second light beam having the second frequency that is a sum of the first frequency and the third frequency.

19. A method in accordance with claim 17, wherein generating the second light beam having the second frequency comprises generating the second light beam having the second frequency that is a difference between the first frequency and the third frequency.

20. A method in accordance with claim 12, further comprising adjusting at least one of the second location relative to the first location and the first frequency to align the receiver and the second light beam.

21. A method in accordance with claim 20, further comprising:
   holding the incident angle and the second location substantially constant; and
   sweeping through a plurality of first frequencies such that the second light beam is reflected at a plurality of reflection angles until the second light beam is directed towards the second location.

22. A method in accordance with claim 20, further comprising:
   holding the incident angle and the first frequency substantially constant; and
   sweeping the receiver through a plurality of second locations until the second light beam is aligned with the receiver.

* * * * *